Aug. 8, 1939.  E. R. SMITH  2,168,632

FEED MECHANISM FOR A MACHINE TOOL

Filed May 16, 1938  3 Sheets-Sheet 1

Inventor
Edwin R. Smith
By attorney
Chas. T. Hawley

Aug. 8, 1939.  E. R. SMITH  2,168,632
FEED MECHANISM FOR A MACHINE TOOL
Filed May 16, 1938   3 Sheets-Sheet 2
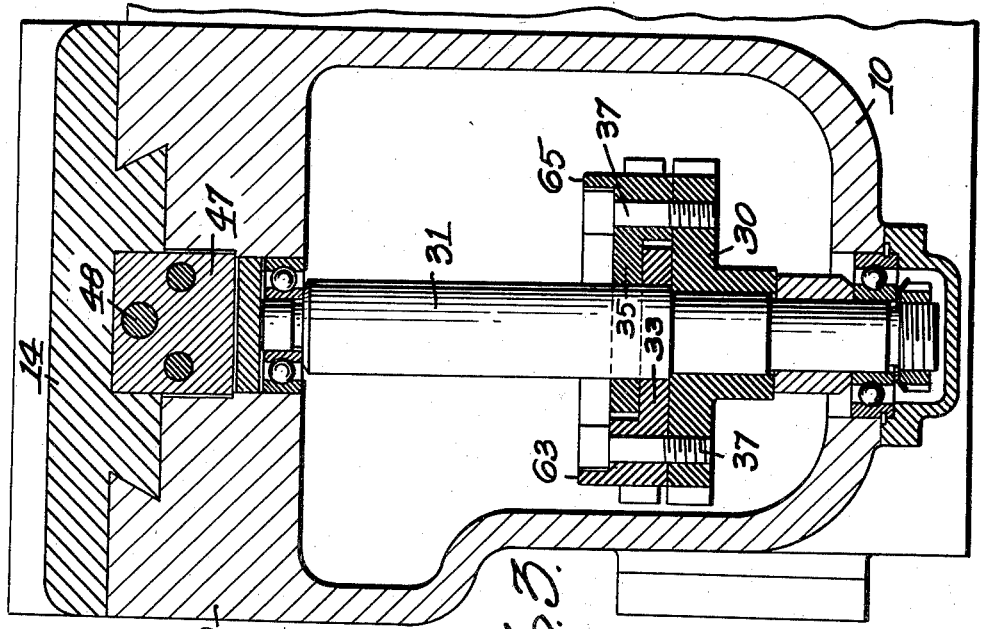
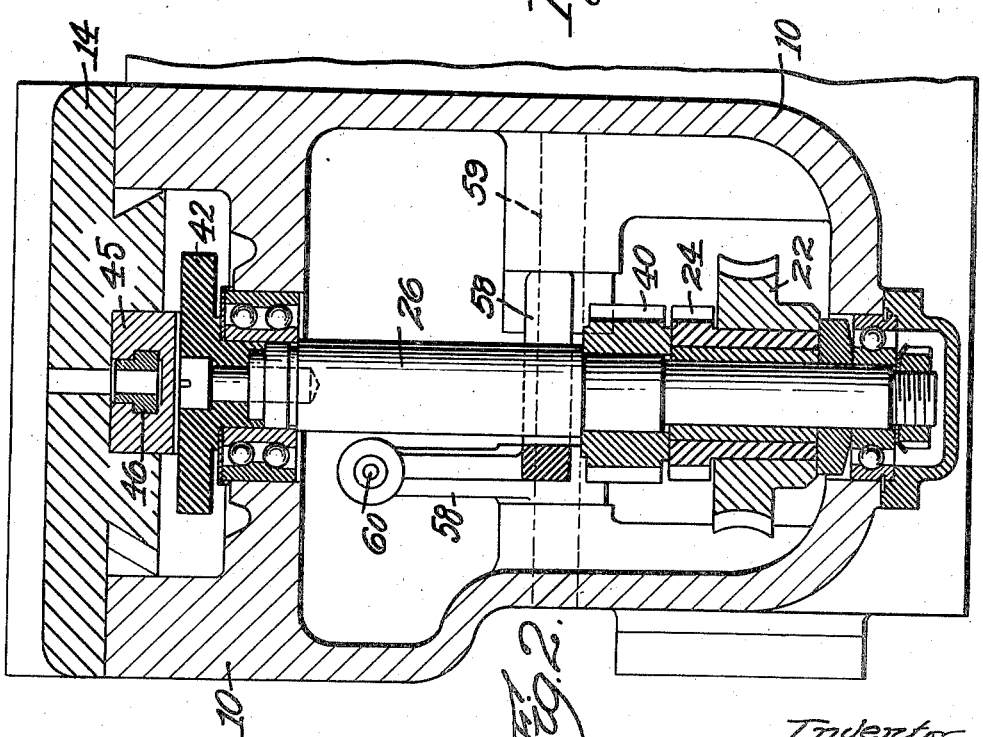

Aug. 8, 1939.  E. R. SMITH  2,168,632
FEED MECHANISM FOR A MACHINE TOOL
Filed May 16, 1938  3 Sheets-Sheet 3
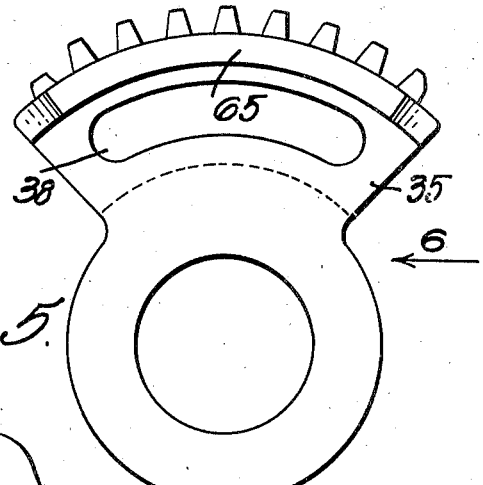
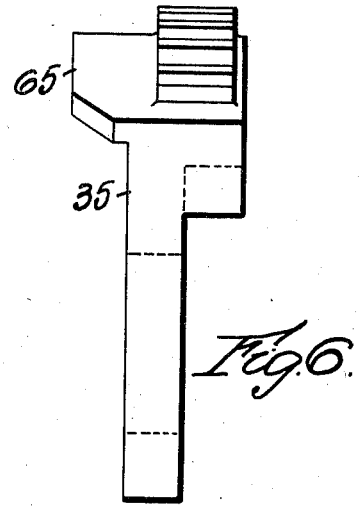
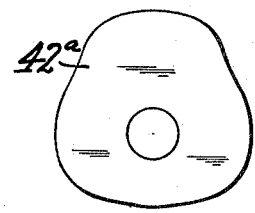
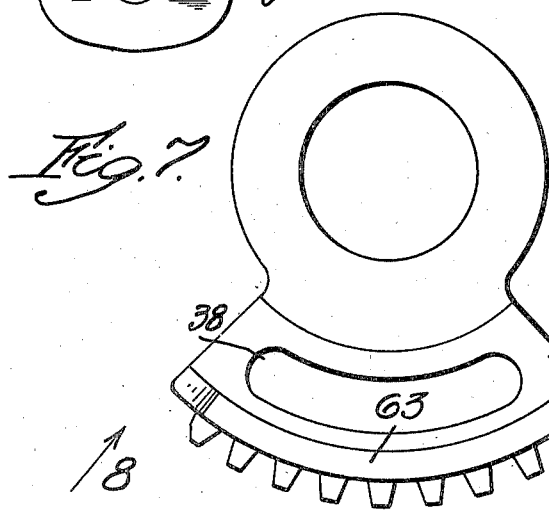
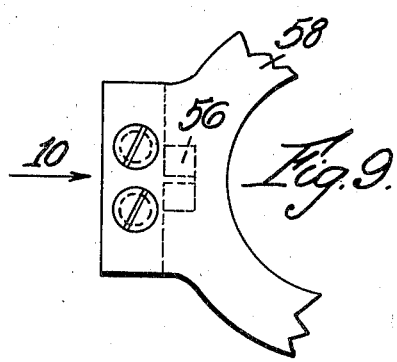
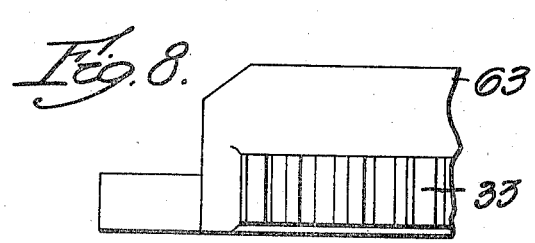
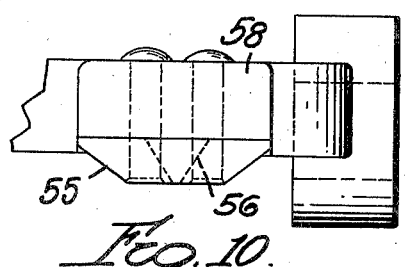
Inventor
Edwin R. Smith
By attorney

Patented Aug. 8, 1939

2,168,632

UNITED STATES PATENT OFFICE 2,168,632

FEED MECHANISM FOR A MACHINE TOOL

Edwin R. Smith, Seneca Falls, N. Y., assignor to Seneca Falls Machine Company, Seneca Falls, N. Y., a corporation of Massachusetts Application May 16, 1938, Serial No. 208,199

11 Claims. (Cl. 82—24)

This invention relates to machine tools such as lathes or grinding machines in which a lathe tool, grinding wheel, or other work-engaging device is mounted on a slide which is moved transversely of the machine toward and from the work.

It is the general object of my invention to provide improved automatic actuating devices by which such a slide may be advanced and withdrawn in predetermined relation to the axial travel of the tool or in relation to some other machine operation.

Another object of the invention is to provide means by which the points of automatic advance and subsequent withdrawal of the slide may be conveniently varied relative to the tool travel or to other machine operations.

My invention further relates to arrangements and combinations of parts which will be hereinafter described and more particularly pointed out in the appended claims.

A preferred form of the invention is shown in the drawings, in which—

Fig. 1 is a sectional end elevation of my improved cross feed mechanism;

Figs. 2 and 3 are sectional front elevations of the mechanism, taken along the lines 2—2 and 3—3 in Fig. 1 respectively;

Fig. 5 is a plan view of a segment gear forming one element of my invention;

Fig. 6 is a side elevation thereof, looking in the direction of the arrow 6 in Fig. 5;

Fig. 7 is a plan view of a second segment gear;

Fig. 8 is a partial front elevation thereof, looking in the direction of the arrow 8 in Fig. 7;

Fig. 9 is an enlarged plan view of a portion of a latch device shown in Fig. 4;

Fig. 10 is a detail front elevation, looking in the direction of the arrow 10 in Fig. 9; and Fig. 11 is a detail view of a cam to be described.

Figure 1:
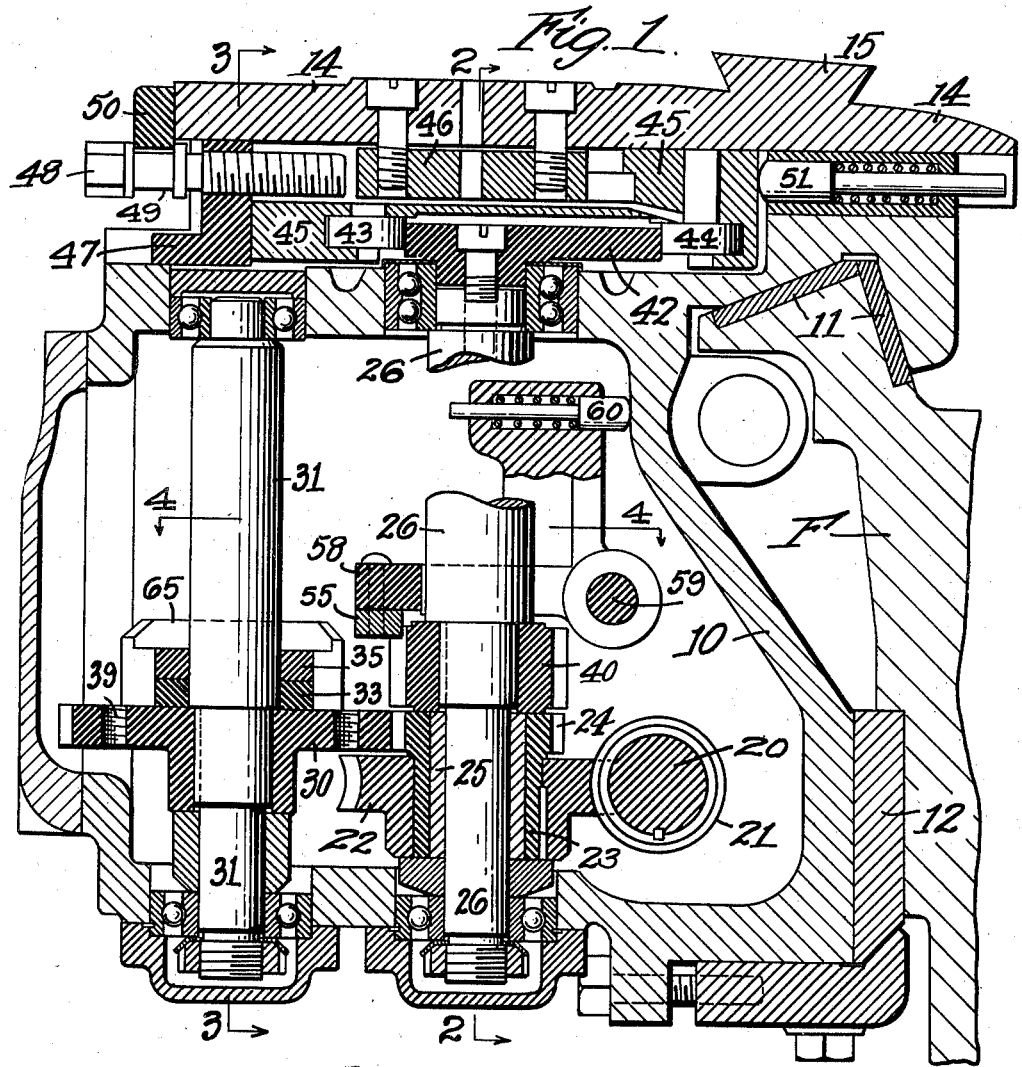

Referring to Figs. 1, 2 and 3, I have shown a portion of the frame F of a machine tool on which a carriage 10 is supported for longitudinal movement on guideways 11 and 12. A cross slide 14 is mounted in transverse guideways (Figs. 2 and 3) on the carriage 10 and is slidable in said guideways toward and away from the work.

Provision for mounting a tool holder on the cross slide 14 is indicated at 15 (Fig. 1) but the detailed construction of the cross slide and tool holder forms no part of my present invention, which relates specifically to improved means for moving the cross slide 14 on the carriage 10 toward and away from the work.

I will now describe the improved mechanism which I have provided for this purpose.

A splined feed shaft 20 (Fig. 1) extends longitudinally of the machine and passes freely through the sides of the carriage 10. A worm 21 is splined on the shaft 20 for rotation thereby but is freely movable longitudinally of the shaft with the carriage 10 as the carriage is moved along its guideways 11 and 12 in the operation of the machine.

The worm 21 drives a worm wheel 22 which is keyed on the elongated hub 23 of a pinion 24, which in turn is freely rotatable on a sleeve 25 rigidly secured on an upright shaft 26. The pinion 24 engages and drives a gear 30 fast on a second upright shaft 31. The shafts 26 and 31 are both mounted in upper and lower anti-friction bearings in the carriage 10.

Figure 4:
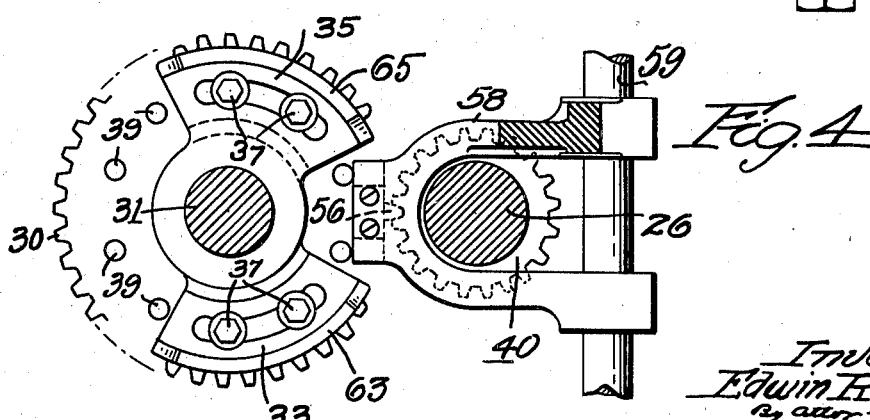
Fig. 4 is a sectional plan view, taken along the line 4—4 in Fig. 1.

Lower and upper segment gears 33 and 35 (Figs. 5 and 7) are centered on the shaft 31 and are secured to the gear 30 by clamping screws 37 (Fig. 4) which extend through elongated slots 38 in the segment gears 33 and 35 and which are inserted in selected threaded holes 39 (Fig. 4) in the gear 30.

The gears 33 and 35 are positioned to intermittently engage a pinion 40 fixed on the upright shaft 26. The number of teeth in each segment gear is commonly such as will give the pinion 40 a half revolution.

A cam 42 (Fig. 1) is secured in fixed angular relation to the upper end of the shaft 26 and is engaged by cam rolls 43 and 44, rotatably mounted in a supporting member 45 slidably supported by a guide block 46 clamped to the under side of the cross slide 14. As the shaft 26 and cam 42 are given successive half revolutions, the cam 42 effects successive rearward and forward movements of the member 45 and cross slide 14.

The member 45 (Fig. 1) is provided with a cross head 47 threaded to receive an adjusting screw 48. The head of the screw 48 is provided with an annular groove 49 to receive a plate 50 secured to the front end of the cross slide 14. Consequently by turning the adjusting screw 48, the slide 14 may be moved longitudinally relative to the member 45, which member is longitudinally positioned by the cam 42.

A spring plunger 51 mounted in the carriage 10 engages the rear end of the member 45, thus holding the rear cam roll 44 firmly in engagement with the cam 42 at all times and preventing lost motion or chatter.

In order to hold the shaft 26 and cam 42 from angular movement between successive half revolutions, I provide a latch plate 55 (Figs. 1 and 10) having a wedge-shaped locking tooth 56 adapted to be positioned between adjacent teeth of the pinion 40. The latch plate 55 is mounted on a bell crank 58 (Fig. 1) pivoted at 59 in the carriage 10 and having a spring plunger 60 in its upwardly extending arm, which plunger yieldingly engages an inner surface of the carriage 10 and yieldingly holds the latch plate 55 and tooth 56 in locking relation with the pinion 40.

The segment gears 33 and 35 are provided with segment cams 63 and 65 respectively, which cams are of the same height when assembled and are positioned to engage the latch plate 55 and raise the tooth 56 from locking position just prior to engagement of the teeth of the pinion 40 by the teeth of the associated segment gear. The segment cams 63 and 65 are also of such length that the latch plate is released to return the tooth 56 to locking position just as the last tooth of the operating segment gear clears the pinion.

Having described the details of construction of my improved feed mechanism, the operation thereof will be readily apparent. The feed shaft 20 is rotated in definite speed relation to the longitudinal feed of the carriage 10. This speed relation is commonly such that the shaft 31 will be given one complete revolution for each complete cycle of movement of the carriage 10.

During this cycle, the pinion 40 and cam 42 will be given a half revolution to advance the cross slide and tool to working position when the pinion 40 is engaged by one of the segment gears 33 or 35, and will be given a second half revolution to withdraw the slide and tool when the pinion 40 is engaged by the other segment gear.

By adjusting the gears 33 and 35 on the gear 30, the points in the work cycle at which forward and rearward movements of the cross slide occur may be selectively determined, and also the period during which the slide will be in rearward or working position. Consequently the cut produced by the tool on the cross slide may be made to commence at any point in the travel of the carriage 10 and may be of any desired and predetermined extent.

It is thus possible to obtain a wide range of automatic operation and to make cuts in different longitudinal positions and of different lengths by merely changing the adjustment of the segment gears 33 and 35 on the gear 30 and without removing or replacing any parts of the mechanism.

My improved feed mechanism is thus very flexible and readily adapts itself to the production of a wide range of work. Furthermore, the advance movements of the cam 42 are effected through positive gear connections, so that there is no chance for the parts to slip or get out of predetermined timed relation.

My invention is not limited to a construction in which the cam shaft, as 26, is advanced 180° at each engagement of the pinion 40 by a segment gear. By varying the shape of the cam 42 or the number of segment gears or the number of teeth in the separate segments, other operating combinations are easily achieved.

In Fig. 11, for example, I have shown a cam 42a having concentric portions of three different radii. By providing segment gears with the correct number of teeth to advance the cam 42a in 90° steps, a tool slide may be moved successively to two different working positions in addition to its idle or withdrawn position. Other operating combinations will readily suggest themselves. While I have shown and described my invention as embodied in a cross feed mechanism, it is not restricted in its utility to such use, but is adapted to advance and withdraw a tool relative to the work in a direction longitudinally of a machine as well as transversely.

Having thus described my invention and the advantages thereof, I do not wish to be limited to the details herein disclosed, otherwise than as set forth in the claims, but what I claim is—

1. A feed mechanism for a machine tool having a fixed work cycle comprising a slide, automatic means to advance and withdraw said slide, said means comprising an operating shaft and means to give said shaft successive part revolutions during each work cycle, and means to lock said shaft between advance movements thereof.

2. A feed mechanism for a machine tool comprising a slide, a cam engaging said slide, a cam shaft for said cam, means to turn said cam shaft intermittently, and means to lock said cam shaft between angular movements thereof.

3. A feed mechanism for a machine tool comprising a slide, a cam engaging said slide, a cam shaft for said cam, means to turn said cam shaft intermittently, means to lock said cam shaft between angular movements thereof, and means to release said shaft as an angular movement is about to begin.

4. A feed mechanism for a machine tool having a fixed work cycle comprising a slide, a cam engaging said slide, a cam shaft for said cam, means to give said cam shaft successive half revolutions at predetermined points in the work cycle of the machine, and means to lock said shaft between advance movements thereof.

5. A feed mechanism for a machine tool having a fixed work cycle comprising a slide, and automatic means to advance and withdraw said slide, said automatic means including an operating shaft, means to give said shaft two successive half revolutions during each work cycle, and means to vary the points in said work cycle at which said shaft movements take place.

6. A feed mechanism for a machine tool having a fixed work cycle comprising a slide, and automatic means to advance and withdraw said slide, said automatic means including an operating shaft, means to give said shaft two successive half revolutions during each work cycle, a continuously rotated member, and means adjustable on said member to vary the points in said work cycle at which said shaft movements take place.

7. A feed mechanism for a machine tool having a fixed work cycle comprising a slide, a cam engaging said slide, a cam shaft for said cam, means to give said cam shaft successive part revolutions at predetermined points in the work cycle of the machine, means to lock said shaft between advance movements thereof, and means to unlock said shaft as an advance movement thereof is about to begin.

8. A feed mechanism for a machine tool comprising a slide, a cam engaging said slide, a cam shaft for said cam, and means to give said cam shaft successive part revolutions at predetermined points in the work cycle of the machine, said latter means comprising a pinion on said cam shaft and a plurality of segment gears successively engaging said pinion.

9. A feed mechanism for a machine tool comprising a slide, a cam engaging said slide, a cam shaft for said cam, and means to give said cam shaft successive part revolutions at predetermined points in the work cycle of the machine, said latter means comprising a pinion on said cam shaft and a plurality of segment gears mounted on a parallel driven shaft and successively engaging said pinion.

10. A feed mechanism for a machine tool comprising a slide, a cam engaging said slide, a cam shaft for said cam, and means to give said cam shaft successive angular movements at predetermined points in the work cycle of the machine, said latter means comprising a pinion on said cam shaft and a pair of segment gears successively engaging said pinion and each effective to give said pinion and cam shaft a half revolution.

11. A feed mechanism for a machine tool comprising a slide, a cam engaging said slide, a cam shaft for said cam, a pinion on said shaft, a pair of angularly spaced segmental gears successively engaging said pinion, means to lock said pinion when not engaged by one of said gears, and segment cams on said gears effective to release said pinion as engagement thereof by a segment gear is to be effected.

EDWIN R. SMITH.